(12) United States Patent
Smith (10) Patent No.: US 6,674,598 B2
(45) Date of Patent: Jan. 6, 2004

(54) RADIAL POSITIONING OF DATA TO IMPROVE HARD DISK DRIVE RELIABILITY

(75) Inventor: Gordon James Smith, Rochester, MN (US)

(73) Assignee: Hitachi Global Technologies, Amsterdam (NL)

(*) Notice: Subject to any disclaimer, the term of this patent is extended or adjusted under 35 U.S.C. 154(b) by 407 days.

(21) Appl. No.: 09/854,713

(22) Filed: May 14, 2001

(65) Prior Publication Data

US 2002/0186492 A1 Dec. 12, 2002

(51) Int. Cl.$^7$ ............................................. G11B 19/02
(52) U.S. Cl. .......................................... 360/69; 360/31
(58) Field of Search ........................ 360/69, 75, 97.02, 360/235.4, 237.1

(56) References Cited

U.S. PATENT DOCUMENTS 5,543,983 A * 8/1996 Gregory et al. .......... 360/97.02

OTHER PUBLICATIONS

IBM Patent Application "Adaptive Actuator Radial Positioning to Extend Magnetic Disk Drive Longevity"; Ser. No. 09/814,335; Filed Mar. 21, 2001.

* cited by examiner

Primary Examiner—David Hudspeth
Assistant Examiner—Mitchell Slavitt
(74) Attorney, Agent, or Firm—Crawford Maunu PLLC (57) ABSTRACT

To optimize the life of a magnetic disk data storage device it is recognized that the accessing of data on the disk data surface should mimic the varying effective lubricant protection over the disk surface. The lubricant applied to the disk data surfaces migrates outward during drive operation. To match the disk surface protection to the frequency of data accesses at the storage locations, the stored data files are periodically examined to determine how recently access has occurred and the number of accesses during a most recent fixed period to determine whether the data file is to be stored in radially inner or radially outer portions of the band of concentric data tracks. By thus allocating the data file storage location, the data is accessed and intermittent contact between disk surface and transducer carrying slider occurs with greatest frequency where the lubricant coating is least depleted and most robust.

13 Claims, 6 Drawing Sheets

TABLE 4A

| Logical Block Address | Frequency of Use | Disk Radius |
|---|---|---|
| 1 | 10 | Outer Diameter |
| 2 | 7 | |
| 3 | 233 | |
| 4 | 5 | |
| 5 | 1 | |
| 6 | 1 | |
| 7 | 1235 | |
| 8 | 34 | |
| 9 | 566 | |
| 10 | 54 | |
| 11 | 54 | |
| 12 | 54 | |
| . | . | |
| . | . | |
| N | $F_N$ | Inner Diameter |

Before LBA Reassignment

FIG. 4A

TABLE 4B

| Logical Block Address | Frequency of Use | Disk Radius |
|---|---|---|
| 7 | 1235 | Outer Diameter |
| 9 | 566 | |
| 3 | 233 | |
| 10 | 54 | |
| 11 | 54 | |
| 12 | 54 | |
| 8 | 34 | |
| 1 | 10 | |
| 2 | 7 | |
| 4 | 5 | |
| 5 | 1 | |
| 6 | 1 | |
| . | . | |
| . | . | |
| N | $F_N$ | Inner Diameter |

After LBA Reassignment

FIG. 4B

RADIAL POSITIONING OF DATA TO IMPROVE HARD DISK DRIVE RELIABILITY

FIELD OF THE INVENTION

This invention pertains to rigid disk storage devices and more particularly to a method of allocating data storage locations on the disk surface responsive to the change of lubricant thickness as a result of lube migration over time.

BACKGROUND OF THE INVENTION

Magnetic disk drives utilize disks manufactured to have a very uniform flat surface with the ultimate coatings being a sputtered magnetic coating and usually a thin protective coating and finally a thin film of lubricant. The protective coating and lubricant are very thin since they occupy a part of the space that separates the magnetic storage layer and the transducer carrying slider that flies only a few microinches above the disk surface. As data storage densities get greater, the number of tracks per inch and the number of bits per inch increase and also the layer of magnetic material becomes thinner. As the magnetic domains become smaller, the slider must fly lower to reduce the separation between the transducer and the magnetic surface. These conditions lead to more frequent incidental contact between slider and disk.

The lubricant may be one or multiple materials, but the overall lube normally has two portions. One portion of the lube bonds chemically to the underlying surface material and the remainder is mobile. The chemically bonded fixed lubricant is only a small portion, even when only one lubricant material is applied. The mobile portion of the lubricant film migrates outward over time, leaving the inner tracks of the band of data storage tracks with little but the bonded lubricant resident at the disk surface. Thus, any intermittent slider disk contact with the data track area near the inner diameter of the data band is much more detrimental to disk life than such disk contact with the data area adjacent the outer radius of the data band. The lube migration does not result in a linear distribution, but causes a greater concentration at the outer periphery of the disks.

The majority of data storage tracks tend to be substantially depleted while only a minority of the total number of tracks at the outermost diameter of the band of data tracks retain any significant thickness of mobile lubricant film.

SUMMARY OF THE INVENTION

To accommodate the migration of disk surface lubricant that occurs over time it is prudent to adaptively control the location of data in a manner that causes the frequency of data accesses more closely mimic the lubricant thickness.

The method of the present invention causes the drive control system to periodically review the stored data on the disk surfaces during the idle time between read/write commands. By identifying data files recently accessed and data files most frequently accessed during a predetermined number of most recent operating hours and storing such data files in the outer portion of the storage band while moving other data files to the inner portion of the band of data storage tracks the data accesses occur most frequently in the disk storage area that is more adequately lubricated. This is accomplished by recording, with respect to each stored data file, the data file length, the last access in terms of power on hours (POH) and the number of accesses during a most recent period. Comparisons are made with the current POH value and the most recent period is a fixed moving period of POH that ends with the current value of POH.

Since the lube thickness across the data band is not linear, the preferred location for frequently accessed data includes less than the outer half of the band. Accordingly, in the embodiment of the invention describer hereafter, the data band is arbitrarily separated into the outer third and the inner two thirds. This partitioning may be varied by the migration characteristics of the particular lubricant used, the rotational velocity of the disks, and the location of the disk in the disk pack.

DETAILED DESCRIPTION

Figure 1:
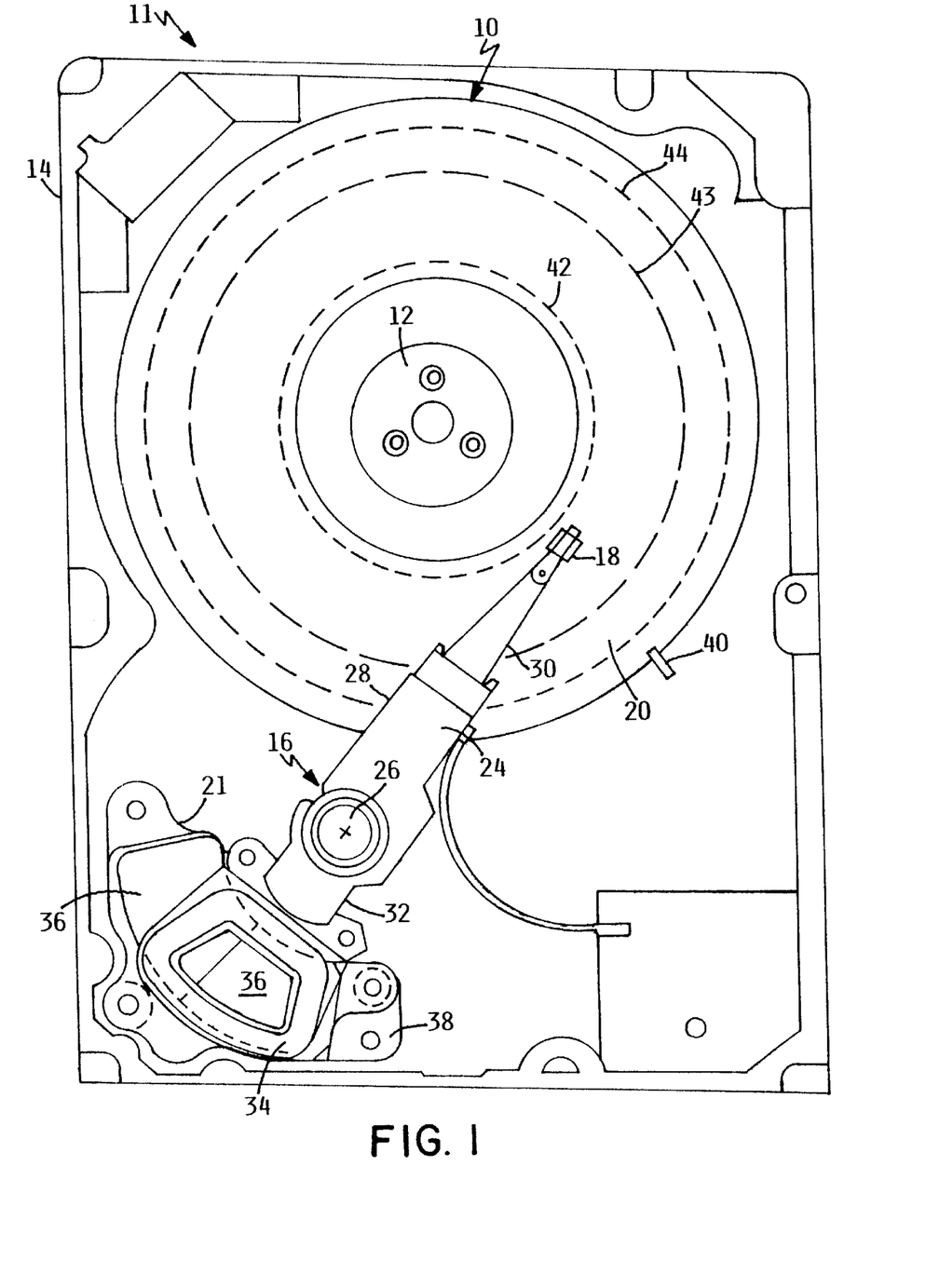
FIG. 1 is a plan view of a typical disk drive with the cover and portions of the voice coil motor removed to illustrate the principal assemblies of such a device.

FIG. 1 illustrates a typical rigid disk drive 11 for storing data including one or more disks 10 mounted for rotation about a spindle 12 which is supported on a rigid base or frame 14. An actuator assembly 16 carries the sliders 18 that carry the transducers that record data on and read data from surfaces 20. Actuator assembly 16 includes a stationary portion 21 secured to base 14 and a pivotable portion 24 which pivots about a stationary post 26. Actuator arms 28 carry flexures 30 which in turn support the sliders 18 that confront the disk surface. The flexure 30 allows the slider 18 to move toward and away from the disk surface 20 and a gimble connection (not shown) between flexure and slider allows the slider to pitch and roll during flight. An arm 32, at the side of the pivotable actuator assembly opposite the transducer carrying arms 28, supports a voice coil 34 which is part of the voice coil motor (VCM) that drives and controls the pivotal motion of the actuator assembly. The VCM includes permanent magnets 36 supported on the bottom plate 38 formed of magnetically permeable material. An upper plate member (not shown) of magnetically permeable material is attached to the portion 21 to form a flux path which is interrupted by a gap across which magnetic flux flows. The coil 34, supported on an arm 32, is positioned in the air gap and drives the actuator pivotable portion one direction when current flows through the coil in one direction and drives the actuator pivotable portion in the opposite direction when the current through the coil is reversed. When the drive is shut down, the actuator is pivoted toward the outer diameter of the disk where the flexures 30 engage ramps 40 and cause the sliders to be lifted away from the disk surface 20 before disk rotation is stopped, to prevent sliders from landing on the disk surface. A cover (not shown) is secured to base or frame member 14 to form a hermetic seal and thereby exclude particulate or contaminant materials from the enclosure.

One the disk surface 20, the entire band of data tracks extends from an innermost diameter data track 42 to an outermost diameter data track 44. The one third of the tracks adjoining the outer diameter extends from track 43 to track 44. The remainder of the data tracks from track 42 to track 43 are the two thirds of the tracks adjoining the inner diameter of the data recording surface.

Rigid magnetic data storage disks have a lubricant applied to the surface during manufacture which is of uniform thickness and can be characterized as having a fixed or bonded portion, that forms a chemical bond with the material of the disk surface to which the lube is applied and a remainder that is mobile. When the disk is rotated in a disk drive, the mobile lubricant is dispersed over time and migrates toward the outer diameter of the disk. After three to six months of continuous operation there is probably no more than the bonded lube resident at the inner diameter of the disk storage track band. This leaves the inner tracks of the data storage surface with less lubricant causing that portion of the data surface to be more vulnerable to the occasional disk-slider contact that can damage the disk coatings and is cumulatively the most common cause of ultimate drive failure. To overcome this redistribution of effective disk lubrication, it is necessary to adaptively adjust drive operation to achieve extended drive life.

Figure 2:
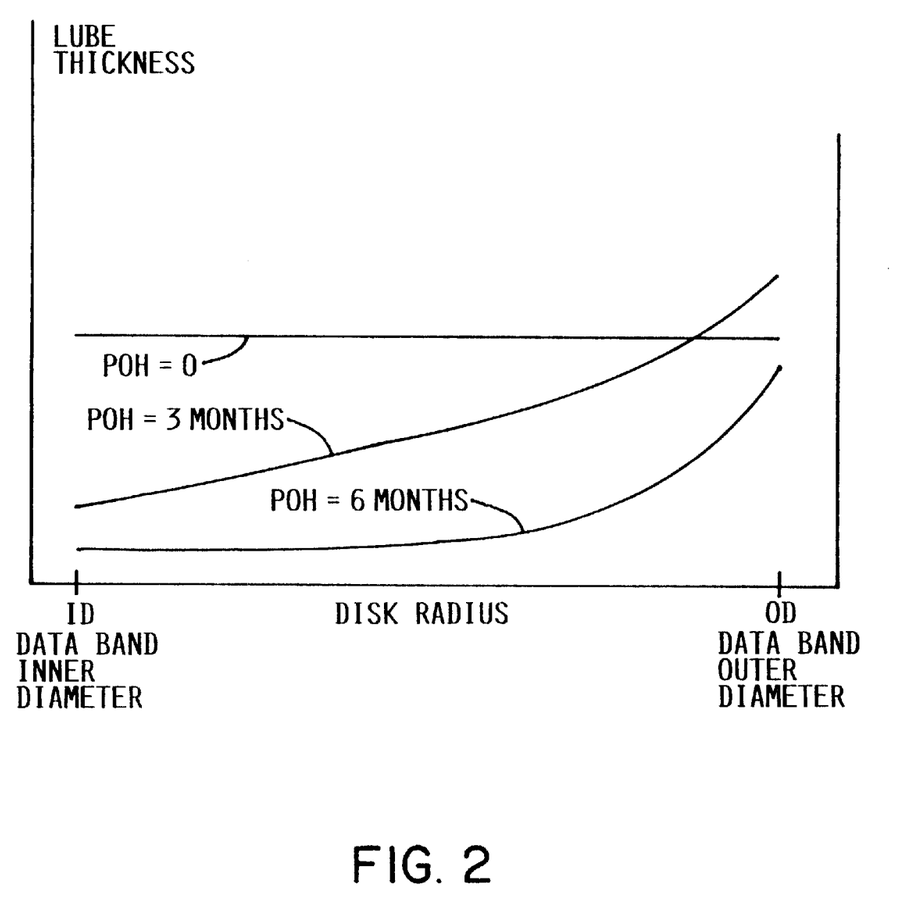
FIG. 2 is a graph with a family of curves showing the lubricant distribution over the band of data tracks on the disk initially and at POH of 3 months and 6 months.

Disk lubricant migration and depletion is illustrated graphically in FIG. 2. Initially, at zero POH the lubricant film is uniformly distributed over the disk surface. As drive life progresses, the lubricant at the inner diameter of the data track band is materially reduced by the centrifugal force of disk rotation, the force applied by the slider flying over the surface, and air shear as air at the disk surface is urged outward by disk rotation. The air shear along data surfaces at the ends of a disk stack is greater than along confronting disk surfaces within the disk stack. The closely spaced confronting inner disk surfaces offer greater resistance to air flow since air must flow radially inward at the center of the space separating the disk surfaces and then radially outward along the disk surfaces. Thus, the lube migration on the disk surfaces at the end of a disk stack is more rapid than on surfaces within the disk stack. Accordingly, the threshold time for invoking the present invention can be greater for intermediate disk surfaces than for the surfaces at the ends of the disk stack. As shown by the 3 month POH curve of FIG. 2, the migrating lubricant may cause an increased film thickness at the outer diameter of the band of data tracks, but ultimately (as shown by the 6 month POH curve) the entire radius of the data track band is depleted with only the outer margin, including less than half the band of data tracks having any significant resident mobile lubricant.

Figure 3A:
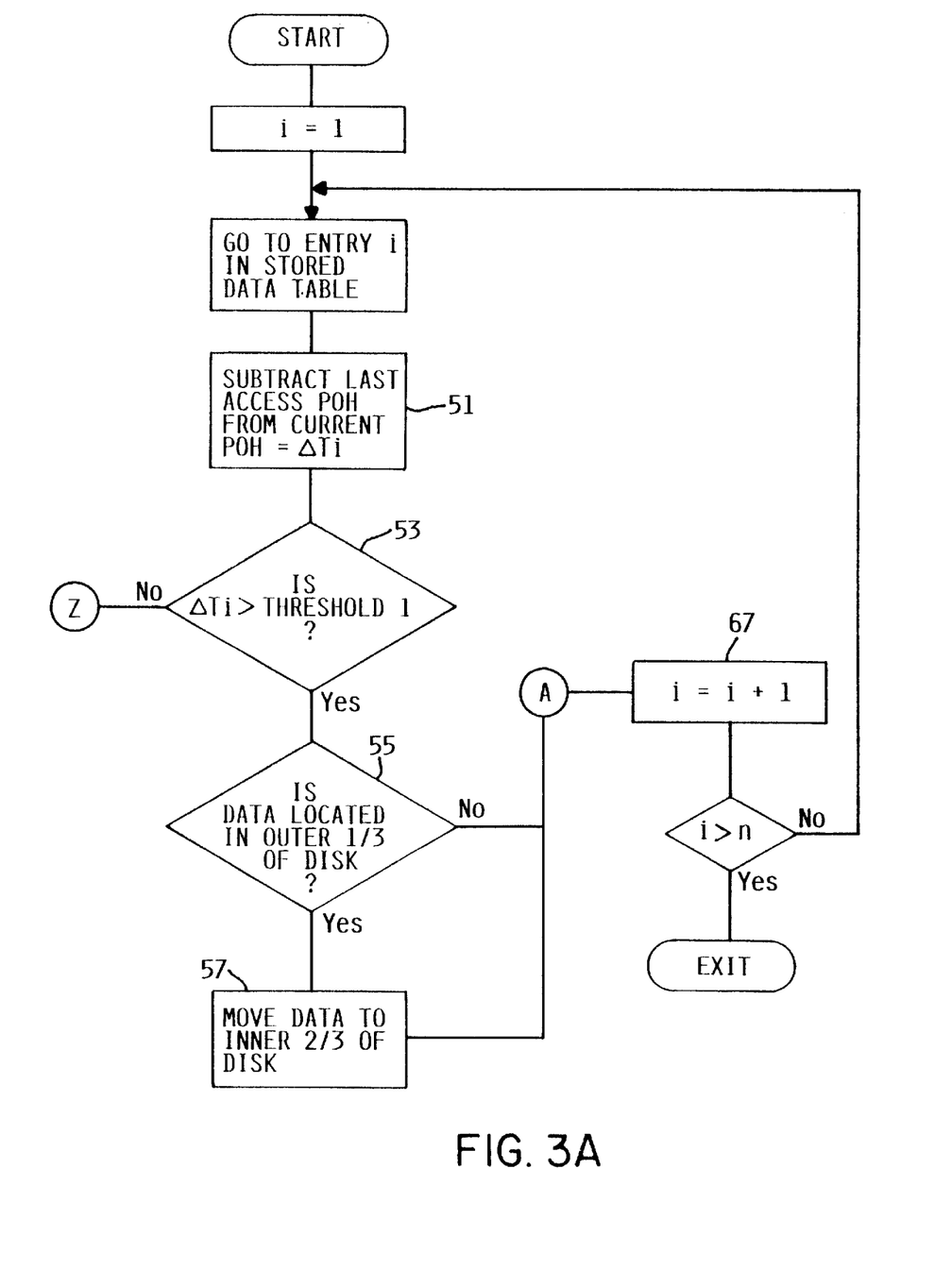
FIGS. 3A and 3B collectively show a flow diagram illustrating an embodiment of the adaptive data storage allocation method of the present invention.
Figure 3B:
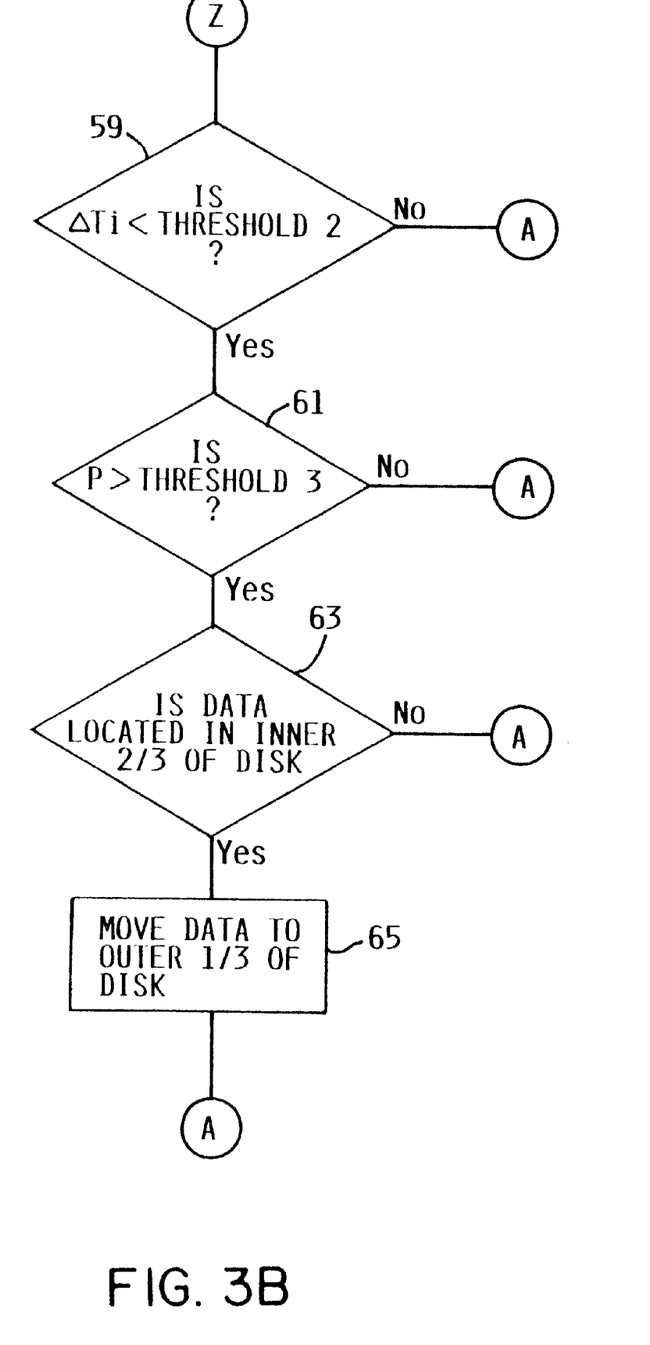

FIGS. 3A and 3B illustrate one embodiment of the invention for managing the location of data storage on a rigid disk to adaptively respond to the change in lubricant thickness over time within the band of concentric tracks used for data storage. The routine is entered by the control system when the drive has been idle for a predetermined number of minutes and examines the data files in table 1 to identify data files or files that are candidates for relocation to a more appropriate location based on the most recent access and the number of accesses during the most recent span of a predetermined number of POHs. When the routine is entered, the data files stored on the drive are examined consecutively beginning with data file 1 on Table 1 and continuing until the final data file (data file N) have been reviewed. As Table 1 indicates, the recorded attributes of the data files include: the starting address, data file length, time of last access (in terms of POH) and the number of accesses, which have occurred during the most recent span of a number of POH (as a moving sum of the number of accesses during the most recent period of M hours).

TABLE 1

| Data File Number | LBA Start | Number of LBA | Time of Last Access (POH) | Accesses During Last M Hours |
|---|---|---|---|---|
| 1 | 0 | 10 | 3180 | 7 |
| 2 | 11 | 2 | 200 | 0 |
| 3 | 14 | 1000 | 1325 | 0 |
| 4 | 1014 | 1 | 3200 | 12 |
| 5 | 1016 | 2 | 2000 | 0 |
| N | | | | |

Power On Hour (POH) Counter – Current Value = 3200

As shown in FIGS. 3A and 3B, the allocation routine is started by accessing the information pertaining to the first stored data file from the table (Table 1) and the last access time (POH) is subtracted from the current POH value (block 51) to determine delta Ti. At block 53 delta Ti is compared to a Threshold 1 value and if delta Ti is greater than the value, it is determined at block 55 whether the data file is presently stored in the outer one third of the band of data storage tracks and if so, the command is issued at block 57 to move the data file to the inner two thirds of the band of data storage tracks. If at block 53 it is found that delta Ti is less than Threshold 1, delta Ti is compared to Threshold 2 (block 59) which is less than the value of Threshold 1 and if smaller, the number of times the data file was accessed during the most recent period of M POH compared (block 61) to a threshold 3 (a predetermined number of accesses). If the number of accesses is greater than the value of Threshold 3, the data file storage location is determined at block 63 and if it is in the radially inward two thirds of the band of disk storage tracks, a command is issued at block 65 to move the data file to the outer one third of the band of disk storage tracks. When processing of the data file is complete and the data moved, if required, the value of i is incremented by one at block 67 and the routine repeated to examine the next data file until the last data file (data file N) has been reviewed.

Since the number of stored data files may be very large, it is appropriate to store the current value of the data file entry i when the routine sequence is suspended by a read/write interrupt. The routine is then reentered to examine the next sequential data file (the stored entry i) when the read/write interrupt is complete, rather than again starting the routine with the first data file of Table 1.

Figure 4A:
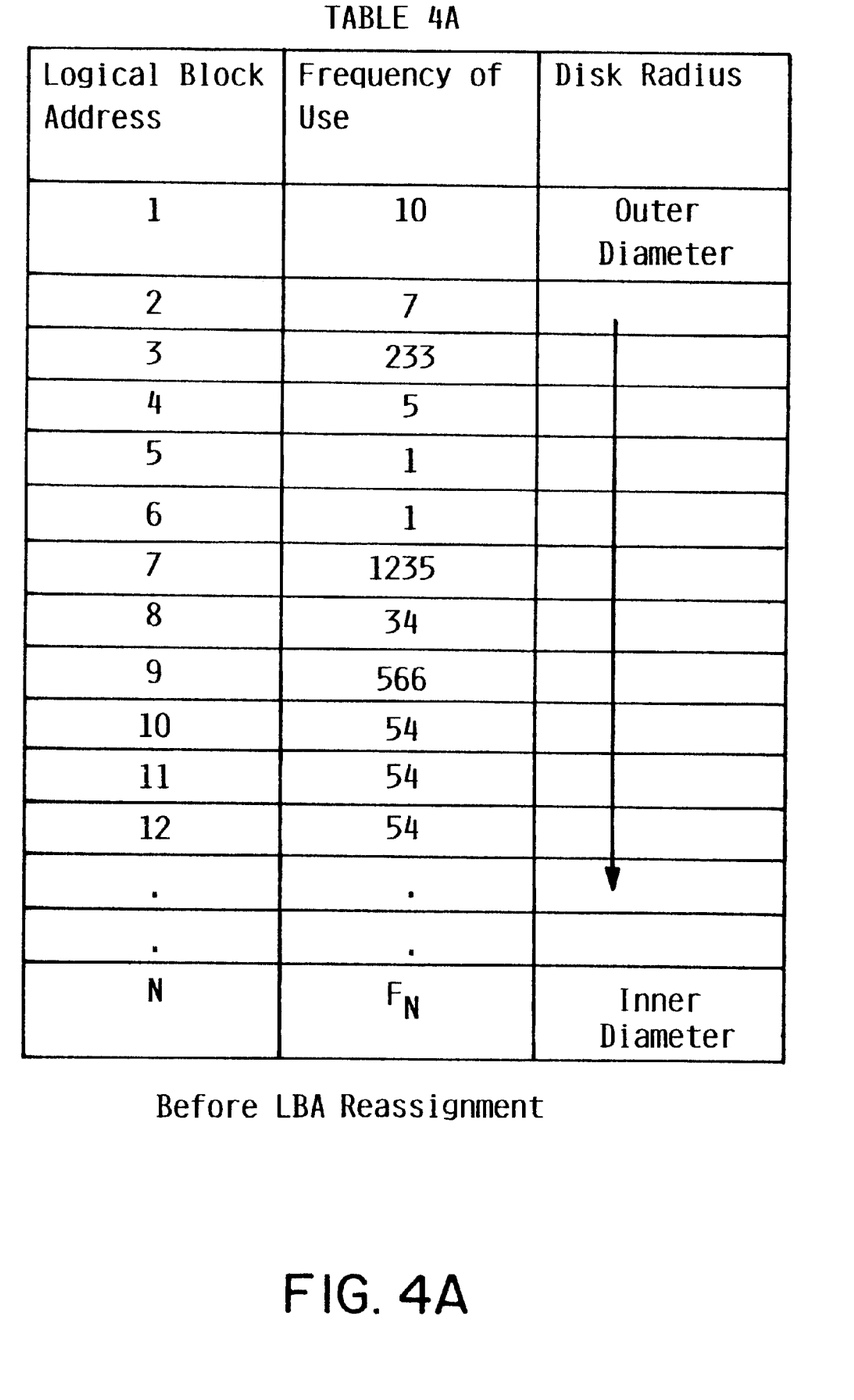
FIGS. 4A and 4B collectively show a pair of tables illustrating how logical block addresses can be moved over time.
Figure 4B:
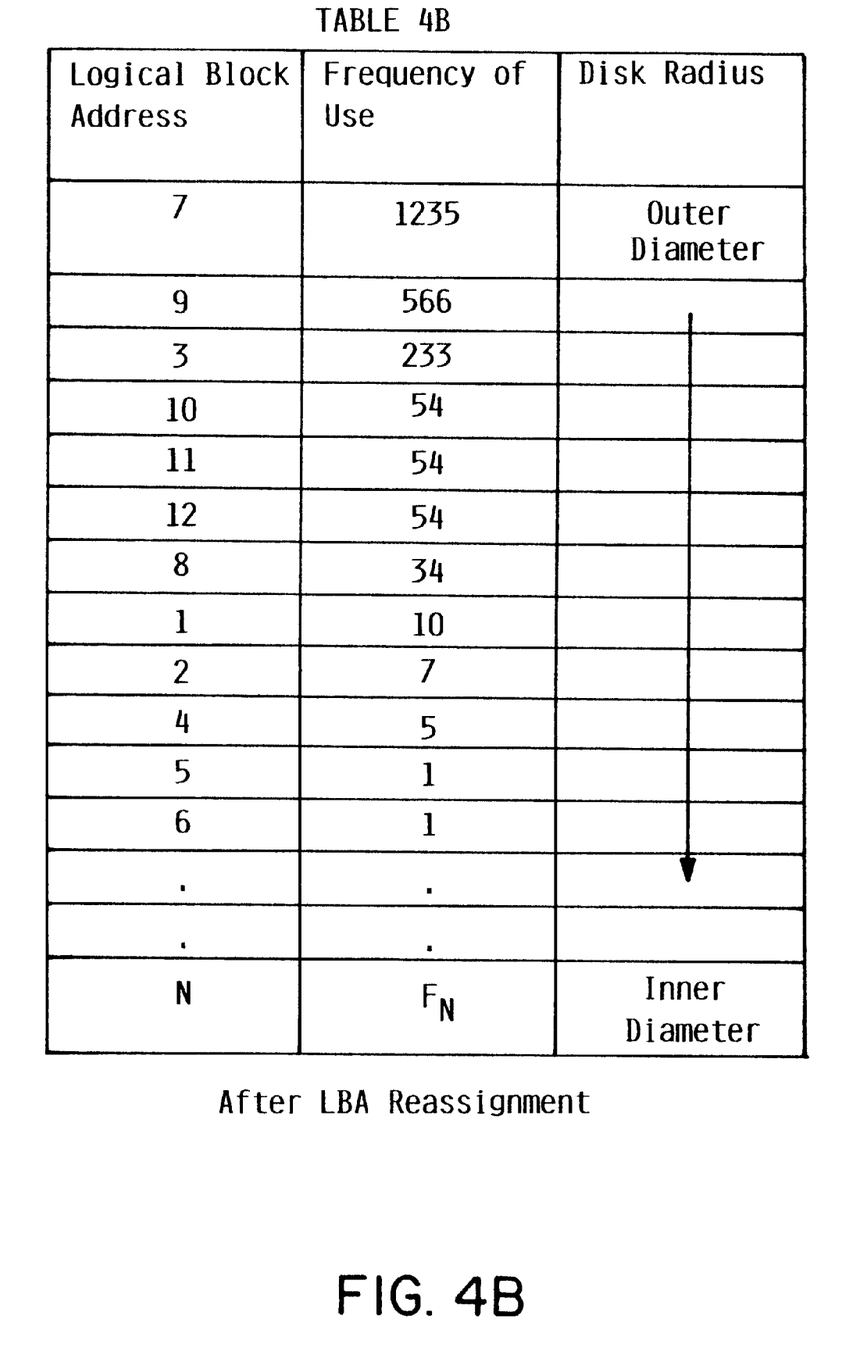

Another embodiment of the invention is shown in the two tables of FIGS. 4A and 4B. In this mode of practicing the invention, the data files are organized to place the most frequently accessed data file at the disk OD and other data files are adjacent the OD in a sequence based on the frequency that the data has been accessed. The frequency of data file accesses can be based on the POH over the life of the drive or a moving period of most recent POH. The table on the left, table 4A, shows how the logical block addresses are assigned in a typical disk drive which uses the small computer system interface (SCSI). In table 4A, the left column gives the logical block address or LBA. Each LBA normally refers to a 512-byte block of data stored on a disk surface in the disk drive. Ordinarily, the LBA's are assigned sequentially so that LBA=0 is, for example, at the outer disk diameter and LBA=19,513,250 is at the inner disk diameter. In table 4A, the activity of each LBA is given by its frequency of use. Also shown in table 4A is the physical location of each LBA. For the purposes of this invention, only the disk radius is necessary. It could be envisioned; however, that a head number would be included if the lube migration was found to be different on various disk surfaces within the drive.

In table 4B, the LBAs have been arranged based on the frequency of use. The frequency of use and corresponding LBAs are sorted from the most frequent use to the least frequent use. The most frequently used LBAs are assigned to the outer disk diameter. This assignment replaces the usual OD to ID assignment, illustrated in table 4A.

While the invention has been shown and described with reference to preferred embodiments thereof, it will be understood by those skilled in the art that various changes in form and details may be made therein without departing from the spirit and scope of the invention.

What is claimed is:

1. In a rigid disk drive wherein data is stored as data files within a band of concentric tracks on rotating disks, with the band of concentric tracks comprising an inner band of contiguous tracks adjoining the inner radius of said band of concentric tracks and an outer band adjoining the outer radius of said band of concentric tracks and wherein said disk storage surfaces are lubricated to protect against intermittent slider contact, a method of adaptively allocating data file storage locations to cause a greater number of read/write accesses to occur at disk locations that retain a more effective lubricant coating comprising sequentially reviewing the data files stored in said disk drive during disk drive power on idle periods and with respect to each data file, ascertaining whether the time since the last access exceeds a first threshold value and if so, allocating such data file to the inner band of tracks and moving said data file to said inner band of tracks if said data file is not already stored in said inner band of tracks; and ascertaining whether the number of accesses over a recent period of time exceeds a second threshold value and if so allocating said data file to the outer band of tracks and moving said data file to said outer band of tracks if said data file is not already stored in said outer band of tracks.

2. The method of adaptively allocating data file storage locations in a rigid disk drive of claim 1 further comprising periodically invoking said sequential review of stored data files and initiating said review only after a predetermined period of idle time.

3. The method of adaptively allocating data file storage locations in a rigid disk drive of claim 2 wherein said recent time period consists of a moving fixed duration power on period terminating with the current power on time value.

4. The method of adaptively allocating data file storage locations in a rigid disk drive of claim 3 wherein said inner band of tracks includes a larger number of tracks than said outer band of tracks.

5. The method of adaptively allocating data file storage locations in a rigid disk drive of claim 4 wherein said inner band of tracks includes about two thirds of the total number of tracks in said band of concentric tracks and said outer band of tracks includes about one third of the total number of tracks in said band of concentric tracks.

6. In a rigid disk drive wherein data is stored as data files within a band of concentric tracks on rotating disks, with the band of concentric tracks comprising an inner band of contiguous tracks adjoining the inner radius of said band of concentric tracks and an outer band adjoining the outer radius of said band of concentric tracks, a method of adaptively allocating data file storage locations within said band of concentric tracks to cause a majority of data accesses to occur nearer the outer radius than the inner radius of said band of concentric tracks comprising reviewing the stored data files to determine, with respect to each, the number of accesses that have occurred during a predetermined number of the most recent power on hours;

comparing the number of accesses to a threshold value;

allocating data files where the number of accesses exceeded the threshold value to said outer band and data files with a fewer number of accesses than said threshold value to said inner band; and moving data files not currently stored the allocated band to the allocated band.

7. The method of adaptively allocating data file storage locations in a rigid disk drive of claim 6 wherein said method is invoked periodically during power on idle periods of said disk drive.

8. The method of adaptively allocating data file storage locations in a rigid disk drive of claim 7 wherein stored data files are reviewed in sequence and further comprising the step of recording the identity of the last data file reviewed so that following an interrupt command, such as for reading or writing data, the sequence is reentered by reviewing the next data file in the sequence during a subsequent disk drive idle period.

9. The method of adaptively allocating data file storage locations in a rigid disk drive of claim 8 wherein said predetermined number of the most recent power on hours consists of a moving fixed duration power on period terminating with the current power on time value.

10. In a rigid disk drive wherein data is stored as data files within a band of concentric tracks, a method of adaptively allocating data file storage locations within said band of concentric tracks to cause a majority of data accesses to occur nearer the outer radius than the inner radius of said band of concentric tracks comprising reviewing the stored data files to determine, with respect to each, the number of accesses that have occurred during a predetermined period of power on hours;

allocating the most frequently accesses data file to the storage location nearest the outer diameter of said band of concentric tracks; and allocating the remainder of the data files progressively radially outward within said band of data tracks in declining order with respect to the number of accesses.

11. The method of adaptively allocating data file storage locations in a rigid disk drive of claim 10 wherein said predetermined period of power on hours comprises a moving period of the most recent power on hours.

12. The method of adaptively allocating data file storage locations in a rigid disk drive of claim 11 wherein the step of reviewing the stored data files occurs periodically to reallocate the storage locations of said data files.

13. The method of adaptively allocating data file storage locations in a rigid disk drive of claim 12 wherein said step of reviewing the stored data files occurs after a fixed number of power on hours subsequent to the prior review and during a power on idle period.

* * * * *

UNITED STATES PATENT AND TRADEMARK OFFICE
CERTIFICATE OF CORRECTION

PATENT NO.    : 6,674,598 B2
DATED         : January 6, 2004
INVENTOR(S)   : Smith It is certified that error appears in the above-identified patent and that said Letters Patent is hereby corrected as shown below:

Title page,
Item [73], Assignee, "Hitachi Global Technologies" should read -- Hitachi Global Storage Technologies Netherlands B.V. --.

Signed and Sealed this

Twenty-seventh Day of April, 2004

JON W. DUDAS
*Acting Director of the United States Patent and Trademark Office*